United States Patent
Müller

(10) Patent No.: US 6,735,447 B1
(45) Date of Patent: May 11, 2004

(54) TRANSMISSION POWER CONTROL OF A MOBILE STATION

(75) Inventor: Walter Müller, Upplands-Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/456,545

(22) Filed: Dec. 8, 1999

(51) Int. Cl.$^7$ .............. H04B 7/00; H04Q 7/20
(52) U.S. Cl. .......... 455/522; 455/517; 455/69; 455/423; 455/67.13; 455/63.1; 455/501; 455/67.11; 455/442; 370/332; 370/318; 370/441
(58) Field of Search ............... 455/522, 517, 455/525, 425, 69, 39, 423, 127, 63, 115, 117, 571, 442, 67.13, 63.1; 375/141; 370/332, 333, 318, 335, 342, 441

(56) References Cited

U.S. PATENT DOCUMENTS

| | | |
|---|---|---|
| 5,241,690 A | 8/1993 | Larsson et al. |
| 5,333,175 A | 7/1994 | Aryavisitakul et al. |
| 5,390,338 A | 2/1995 | Bodin et al. |
| 5,551,066 A * | 8/1996 | Stillman et al. .......... 455/69 |
| 5,553,316 A | 9/1996 | Diepstraten et al. |
| 5,566,165 A * | 10/1996 | Sawahashi et al. ........ 370/342 |
| 5,603,096 A * | 2/1997 | Gilhousen et al. ........ 455/69 |
| 5,666,654 A | 9/1997 | Kanai |
| 5,697,053 A | 12/1997 | Hanly |
| 5,729,557 A | 3/1998 | Gardner et al. |
| 5,732,347 A | 3/1998 | Bartle et al. |
| 5,752,197 A | 5/1998 | Rautiola |
| 5,771,451 A * | 6/1998 | Takai et al. ............... 455/442 |
| 5,774,785 A | 6/1998 | Karlsson |
| 6,256,510 B1 * | 7/2001 | Muraoka ................... 455/522 |

FOREIGN PATENT DOCUMENTS

| | | |
|---|---|---|
| EP | 0 713 300 A | 5/1996 |
| WO | WO 99 65158 A | 12/1999 |

* cited by examiner

Primary Examiner—Lee Nguyen
Assistant Examiner—Marceau Milord
(74) Attorney, Agent, or Firm—Nixon & Vanderhye P.C.

(57) ABSTRACT

A method and apparatus for controlling uplink transmission powers of mobile stations in the cellular system are disclosed. Because mobile stations have inherent limitations and output power dynamic range, one mobile station which migrates very close to a common base station may be instructed to reduce its transmission power level to an amount which is less than the inherent mobile station minimum output power threshold. If the mobile station does not reduce power, it dominates neighboring mobile stations, causing other mobile stations which are operating within acceptable parameters to be dropped in favor of the dominating mobile station. The present invention provides a method and apparatus for removing an offending mobile station transmission until a path loss increases to the point that the offending mobile station can operate within acceptable reception power levels by transmitting at its inherent minimum power level.

15 Claims, 3 Drawing Sheets

TRANSMISSION POWER CONTROL OF A MOBILE STATION

FIELD OF THE INVENTION

The present invention relates to cellular telephone systems, and particularly to mobile station transmit power control.

BACKGROUND AND SUMMARY OF THE INVENTION

It is well-known that cellular communications systems include base stations arranged geographically in a cellular structure to allow mobile radio stations to communicate with one another and with associated switching systems. Communications occur between mobile stations and base stations, and from the base stations to switching nodes. The switching nodes and control nodes communicate through gateways to other communications systems.

In a Code Division Multiple Access (CDMA) mobile communications system, mobile radios can communicate with a common base station using the same radio frequency band because each mobile station employs a different modulation code that distinguishes its communications from those of other mobile radios.

One consequence of the mobile radios in a common cell transmitting on a common frequency is the possibility of interference caused by one mobile station's transmission to another mobile station's transmission. Factors (such as environmental factors proximity, etc.) affect signal strength disparities between multiple mobile radios communicating with a common base station, resulting in interference between "competing" radios. As a result, some mobile radio communications with a communication base station have the potential to dominate others on the same radio frequency band.

In an ideal system, each mobile radio sends signals to a common base station at a power level that ensures all of the different mobile-transmitted signals arrive at the base station with about the same average power that yield an appropriate signal to interference level for each mobile station using the same frequency. But, because the environment of the mobile station, the proximity of the mobile stations, etc. are changing, power levels for all radios is vigilantly controlled. Controlling those power levels, called uplink (or reverse) transmit power control (TPC), from the mobile station to the base station is a significant factor in improving the performance and capacity of a CDMA system.

Several methods are known for controlling uplink power including control based on estimated path loss (or other suitable measure) of signals received from a base station (open loop transmit power control). Another method is for the base station to send transmit power control messages to the mobile station (closed loop power control) based on comparative signal strength received at the base station.

U.S. Pat. No. 5,774,785 (commonly owned) describes one such uplink control method in which a mobile radio restricts its transmission power to a range defined by a maximum and minimum transmission power. U.S. Pat. No. 5,390,338 (commonly owned) describes another transmission control method that relies on the distance between the transmitter and receiver. Other prior art address, in various contexts, how power levels are set to minimum levels to achieve desired performance goals and maximum levels to comply with communications regulations.

Mobile stations are constrained by their design and other factors to practical maximum and minimum power outputs based on their dynamic ranges. A mobile station cannot transmit at power levels outside of its range. This can be a particular problem in situations where a mobile station is very close to a base station and its uplink power level is quite high at the receiving base station. As described previously, ideally a base station receives all transmissions from all assigned mobile radios at about the same power level that yield an appropriate signal to Interference level to avoid interference caused by a dominating mobile radio transmission. When a mobile radio begins to dominate the uplink transmissions of neighboring mobile radios, the mobile receives an instruction from the base station (or generates an internal instruction) to lower uplink transmission power to a more balanced level. A problem occurs, however, when a mobile radio is so close to its serving base station (and thus its received uplink power level is so high) that even at the mobile's minimum output transmit power, the large power level received from the dominating mobile station at the base station is still so large that it causes unacceptable levels of interference. That ultimately may result in a decrease in capacity and coverage at the base station.

One possible solution to the above problem is to increase the dynamic range of the dominating mobile stations. But, that is a physical design change that does not provide immediate relief.

The present invention solves the problem by determining the maximum power level that may be permissibly received by the base station to ensure maximum capacity and acceptable levels of interference. The maximum power reception level may be broadcast by the base station over a control channel or the mobile station may determine the maximum allowed level of reception based on signal-to-interference target values defined for that mobile station. If the mobile station determines that its lowest transmit power level will be received at the base station at a level that exceeds the base station's maximum receive power level, the mobile station deactivates its transmitter. Alternatively, the base station could also detect an excessive receive level and order that mobile station to deactivate its transmitter. Ultimately, the transmission from the mobile station may resume if the received power level from that mobile decreases to acceptable levels, e.g., the mobile moves away from the base station. Otherwise, it may be necessary to release the call.

While much of the relevant prior art tries to optimize transmit power levels in some range in order to minimize interference while ensuring sufficient quality of communication, none propose that a mobile station transmitting at its lowest transmit power level to a base station that is receiving it above the maximum receive level of the base station, stop transmitting to eliminate the interference caused by the mobile's high received power level (even though the mobile is transmitting at its lowest transmit power level). Nor is there any known teaching of specific techniques in this context where a base station or a mobile station determines when the mobile is to stop transmitting or to eventually release the call.

These, as well as other objects and advantages of this invention, will be more completely understood and appreciated by careful study of the following more detailed description of a presently preferred exemplary embodiment of the invention taken in conjunction with the accompanying drawings, of which:

DETAILED DESCRIPTION OF THE PRESENTLY PREFERRED EMBODIMENTS

Figure 1:
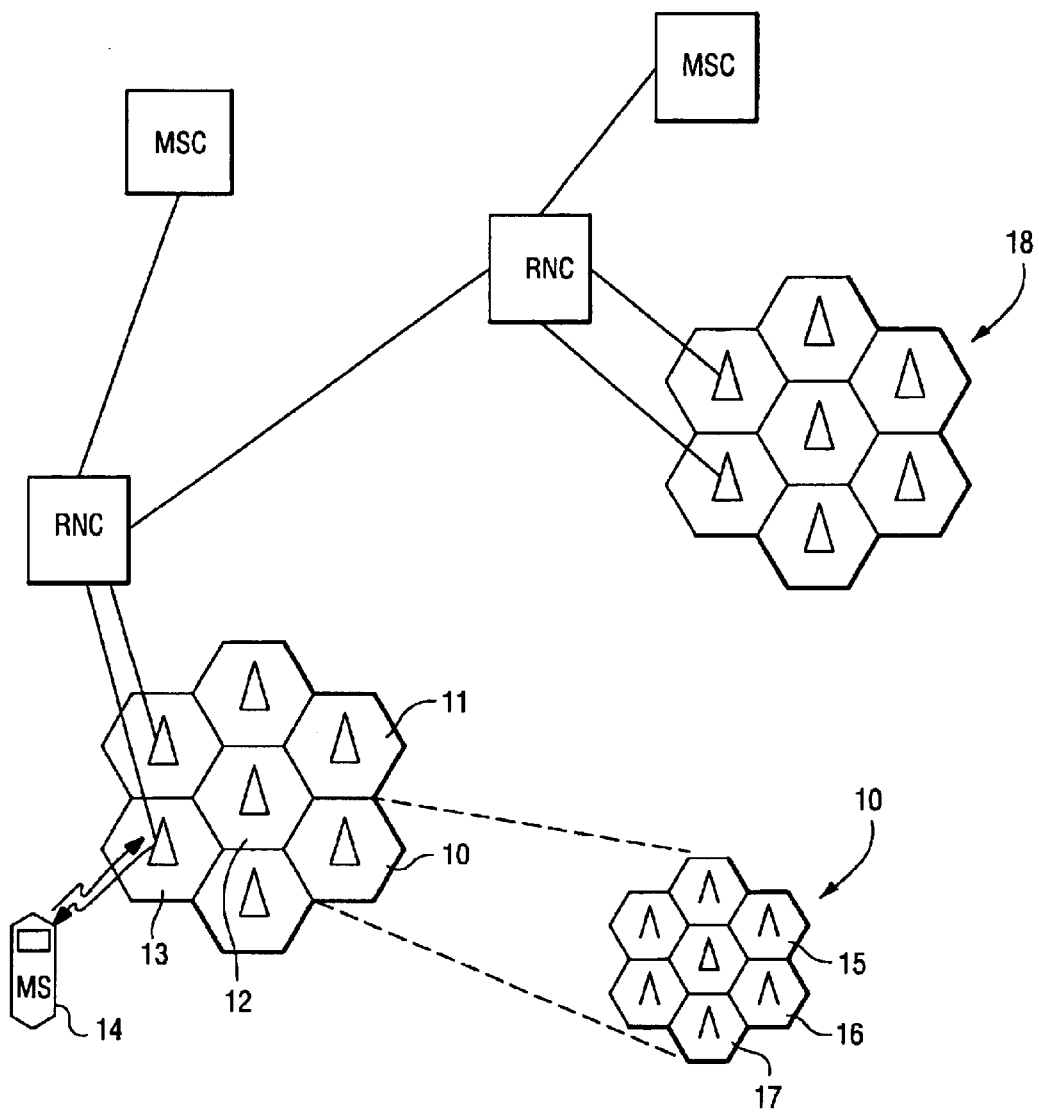
FIG. 1 is a schematic representation of a mobile phone cellular system.

In FIG. 1, a mobile station MS communicates with a base station associated with a cell 13 in which the mobile station currently resides. The base station in cell 13 is part of a larger cellular network including such base stations as base stations 10, 11, 12, 13, etc. The base station 13 receives communications from the mobile station MS and passes them to the radio network core RNC associated with the base station 13. The radio network cores (RNC) communicate with each other through mobile services switching stations MSC in order to connect the mobile station's communications with those of other mobile station's, networks, etc.

When a mobile station MS moves into a cellular geographic area 13, it establishes communications with the base station located in the particular cell 13. Even within the same cellular area 13, the mobile phone MS may be assigned to smaller geographic areas, commonly known as sectors. The sectors may be defined as a result of, for example, directional antenna communications by a base station. In this way, a cell 10 may be divided into sectors 15, 16, 17, etc. such that mobile stations communicating in a sector and within a cell compete for communication time with the base station located therein.

In a system, it is essential that all mobile station transmissions on the same frequency be received at substantially the same power level at a common base station. Because each mobile station operates on a common frequency, it is important that no mobile station transmission occur at a power level that dominates other mobile station transmissions. It would be improper to assume, however, that maintaining a uniform power transmission level at each of the mobile stations will result in a uniform received power level at the base station. Instead, mobile stations within a common cell will transmit to the base station based on a wide variety of different path loss values.

For example, if a mobile station in a common cell is relatively close to a common base station compared to another mobile station, the closer mobile station can expect that the received power level at the base station for its transmissions will be relatively higher than the received power levels for the further mobile stations if one assumes that the transmission levels of the mobile stations is uniform at the time of transmission. Typically, mobile stations that are relatively close to a base station receiver individually or by instruction adjust their transmission power downward in order to maintain a generally uniform received power level at the base station from all of the mobile stations. This power control of the mobile stations is important since failure to achieve general uniformity among the mobile stations in terms of their received signal levels will impact the capacity and coverage of the cell serviced by the base station.

After satisfying standardization specifications (as a result of customer preferences, manufacturing specifications, etc.), mobile stations that operate within any particular cell can be expected to have different operating parameters. One such parameter is the dynamic range of the output power of any particular mobile station. Each mobile station can be defined by a minimum transmitter power level and a maximum transmitter power level, within which the transmitter of the mobile radio operates. In essence, the transmitter cannot operate below it's minimum transmitter power level or above it's maximum transmitter power level. These mobile station parameters thus constrain the ability of the mobile station to increase or decrease transmission power beyond certain limits.

A mobile station operating within a cellular phone structure is shown in FIG. 1. There, a geographic area is divided into cells 10, 11, 12, 13, etc., each with a base station servicing a particular cell. A mobile station 14 (shown located in cell 13), communicates with the base station within cell 13 via bi-directional communication. As the mobile station 14 moves within the geographic region of cell 13, the transmission characteristics as received by the base station in cell 13 will change due to geographic changes, proximity changes, etc. The base station in cell 13 communicates with the mobile station 14 to assist the mobile station in adjusting it's transmission power upward or downward in order to control the reception signal level at the base station. Thus, as the path loss from the mobile station 14 to the base station increases, the transmission power of the mobile station decreases accordingly in order to ensure that the received power at the base station remains generally uniform with that of the other mobile stations in cell 13.

As shown in FIG. 1, each cell 10 can also be divided into sectors 15, 16, 17, etc., which can be defined by directional antennas on the base station in cell 10. The present invention has equal applicability within the sector structure as it does within the cell structure. That is, a base station may attempt to control power levels for all mobile stations within a sector 15, 16, 17, etc., by instructing the mobile stations to adjust their transmission powers upward or downward depending on the path loss between the respective mobile stations and the antenna of the sector.

To complete the description of FIG. 1, one can see that the base station in cell 13 communicates with a radio network core (RNC), which communicates with other radio network cores of other cellular structures 18. The radio network cores also communicate with mobile services switching centers (MSC) which act as gateways to other networks such as the Internet, other telephone networks, etc.

Figure 2:
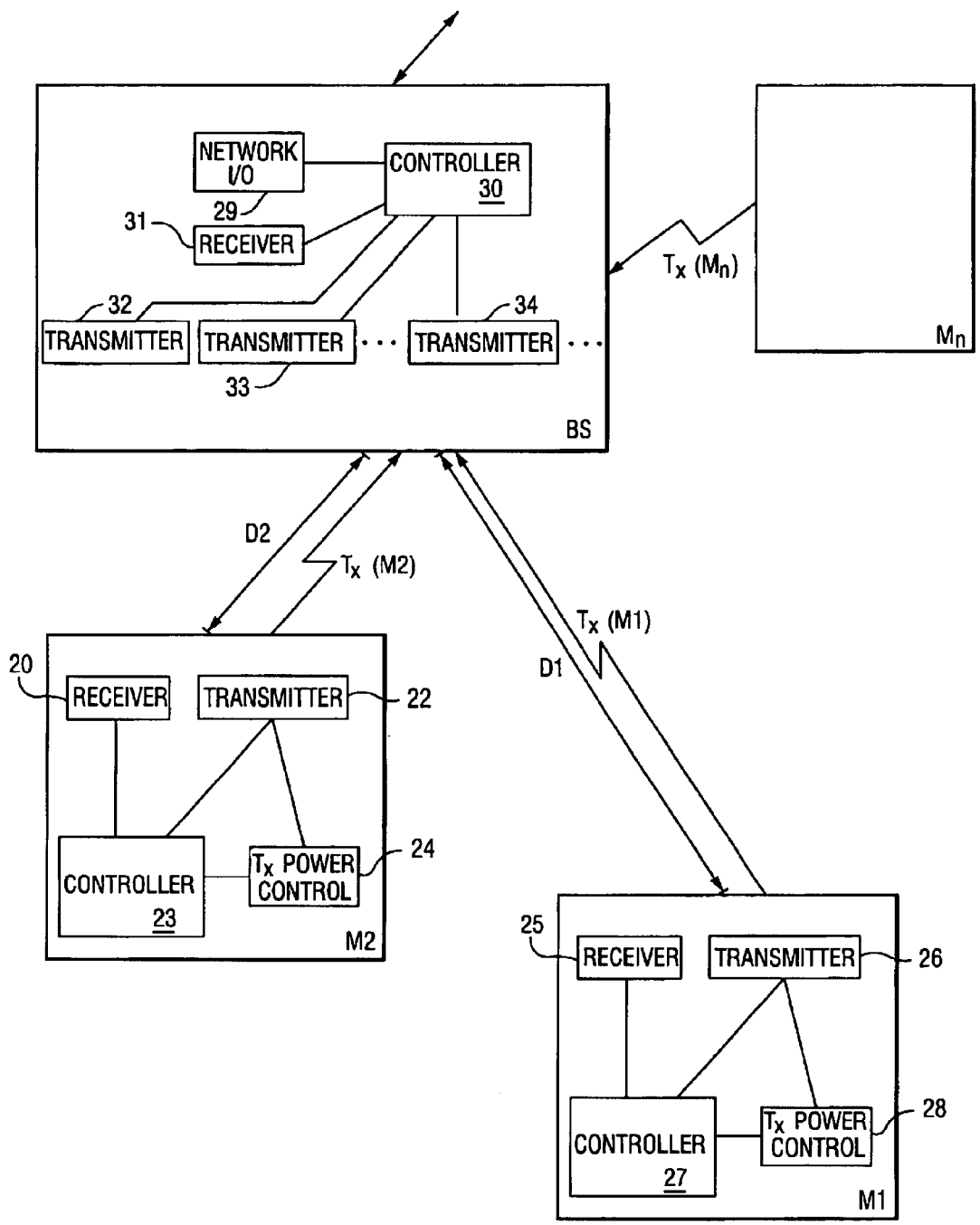
FIG. 2 are schematic representations of a soft diversity handoff.

FIG. 2 illustrates the structures of various mobile stations communicating with a common base station. In FIG. 2, three mobile stations are shown, M1, M2, and $M_n$. Although only three mobile stations are shown, one can understand that as many mobile stations as a base station capacity will tolerate, can be envisioned within the present invention. The mobile stations M1, M2, and $M_n$ communicate with base station BS and RNC via a number of commands and traffic channels which are not necessarily shown in FIG. 2.

Each mobile station M1, M2, and $M_n$ includes receivers 20, 25, and transmitters 22, 26. The receivers 20, 25 receive communications from the base station BS and the transmitters 22, 26 transmit signals to the base station BS, including the transmission signals shown as $T_x$(M2) and $T_x$(M1). The transmitted signals shown from mobile station M2 and M1 to the base station BS ($T_x$) are the standard uplink communications from a mobile station to the base station BS. The receivers 20, 25 and transmitters 22, 26 are controlled by controllers 23, 27. Further, transmission power control over the transmitter 22, 26 is performed by elements 24, 28 in accordance with instructions either received from the base station BS or RNC or estimated by the mobile stations themselves.

As shown in FIG. 2, mobile station M1 is a geographically further in distance D1 from the base station BS in comparison to the distance D2 of the mobile station M2. Thus, assuming all other factors to be equal, one would assume that if mobile stations M1 and M2 transmit signals $T_x$ at equal signal levels, that the base station BS will receive the transmitted signals at different signal levels. That is, one would expect that the signal level from the mobile station M2 would be received by the base station BS at a higher signal level (lower path loss) than that experienced from the mobile station M1 due to the proximity of mobile station M2 relative to the base station BS.

The base station BS includes transmitters 32, 33, 34 to transmit to the receivers 20, 25. It also includes receiver 31 to receive transmissions from the transmitters 22, 26. A network I/O 29 couples the base station BS with the radio network controller RNC. Finally, controller 30 controls the receiver 31, and transmitters 32, 33, 34 to optimize communications with the mobile stations in the cell serviced by the base station BS. (FIG. 2 illustrates the transmitters being associated with different sectors served by the same base station (softer handover), but the invention appears equally well in soft handover where the multiple transmitters used to communicate with one mobile station are in different cells serviced by different base stations).

The controller 30 and/or RNC is responsible for monitoring transmission power levels from the many mobile stations being serviced by the base station BS. Ordinarily, the BS measures total and individually received power levels from all MSs using that BS, and reports to the RNC. The RNC determines if a MS is dominating and when other MSs are suffering because of it. When mobile station M2 moves closer to the base station BS such that the received signal level of $T_x$ (M2) exceeds a threshold, the controller 30 will transmit from one or all of the transmitters 32, 33, 34 to the receiver 20 of mobile station M2 instructing the $T_x$ power controller 24 to reduce transmission power from the transmitter 22. In this way, the controller 30 of the base station BS attempts to maintain a level of uniformity in the received signal levels of all of the transmissions from all of the mobile stations being serviced by the base station BS on a specific frequency.

There are however occasions when the path loss between a mobile station (for example, MS2) and the base station antenna is so small that the mobile station cannot reduce its transmission power sufficiently to bring its corresponding received signal level down to an appropriate level at the base station BS. This generally occurs because the mobile station has reduced it's instantaneous transmission power levels to the minimum level within the mobile station range of transmission power levels. In such a case, the low path loss causes the mobile station to dominate the other mobile stations in the cellular area and the mobile station minimum transmission power floor prevents the mobile station from reducing its instantaneous transmission power to a level sufficiently low to prevent the domination. As a result, the one mobile station that has encountered the low path loss situation, disrupts the base station's ability to keep all received power levels for all mobile stations at a generally common level.

Thus, although mobile stations can accommodate lower path loss conditions by decreasing their output power, they can only do so down to the floor of the minimum transmission output power level dictated by the mobile station. Thereafter, the mobile station transmissions may severely disturb other mobile station transmissions, reduce capacity, and reduce coverage of the base station transmissions. Eventually, the neighboring mobile stations (which are operating within the common received power level attempting to be maintained by the base station) will be dropped due to the interference caused by the one dominating mobile station.

The neighboring mobile stations can attempt to accommodate a dominating mobile station by having the neighboring mobile stations increase their output power. Those mobile stations, however, also operate with minimum and maximum transmission power constraints such that those mobile stations already transmitting at their highest power level will fail to compensate for the increased disturbance caused by the dominating mobile station. In that case, the mobile stations that are actually operating within the base station parameters will be dropped in favor of the dominating mobile station that is not operating within the base station parameters.

Further, the one dominating mobile station causes all other mobile stations to increase power levels which is a high power control requirement and may result in instability in the power control.

In accordance with the present invention, the dominating mobile station is not permitted to cause complying mobile stations to be dropped from a base station coverage. In a preferred embodiment, a mobile station receives information about a maximum allowed level of reception at the base station BS. This can be achieved by the base station broadcasting the maximum allowed reception level to all mobile stations in a cell serviced by the base station. Alternatively, this information can be sent to each mobile station by dedicated messages sent from the RNC. The mobile station can then test it's transmission parameters to ensure that its lowest possible transmission level will allow the mobile station to reduce power so as to yield a received power level within acceptable limits at the base station BS.

A mobile station that determines itself to be out of compliance with a received signal level at the base station BS could, with or without notification to the base station, turn off its transmission and wait until an estimated level of reception at the base station is below a maximum allowed reception level. Thereafter, the mobile station can turn it's transmitter on again and can operate within its own dynamic ranges to achieve a reception level at the base station within the acceptable levels of the base station BS.

Currently in the 3GPP standard, for example, the network can, upon demand, get the following reports from a mobile:
  a report to the network that informs the network that the power used by the mobile reached a minimum value and did so for a while.
  a report to the network that informs the network that the power used by the mobile reached a maximum value and did so for a while.
  a report to the network that informs the network that the power used by the mobile reached above a predefined threshold and did so for a while.
  a report to the network that informs the network that the power used by the mobile dipped below a predefined threshold and did so for a while.

By using these event triggered information reports from the mobile the network is able to detect potentially dominating mobiles or mobiles that have a high probability to become dominating and take appropriate actions. The Network also uses the reports to detect when mobiles have ceased dominating. By adding on measurement information e.g., pathloss estimates, the network can also estimate the degree of domination.

Before a dropped mobile station resumes transmission on the transmitter 22 to make random access or packet transmissions, the mobile station should again estimate the expected received power level at the base station to ensure that it is below the maximum allowable level. This estimation will again presume that the mobile station can operate at its lowest transmission power level. The estimation will allow the mobile station to make a preliminary determination regarding whether its operation and its minimum transmission power level will result in a received power level at the base station that is undisturbing to the neighboring mobile stations. Of course, the mobile station should be delayed in its transmission of random access or packet transmissions until the path loss between the mobile station and the base station becomes sufficiently large so that the mobile station can operate at its lowest transmission power level and result in a received power level at the base station that is below the maximum allowable rate. If the delay becomes too long, the mobile station can release its call. Further, the base station can order a mobile station to attempt to achieve a lower received power level, turn off its transmitter, or release a call.

Figure 3:
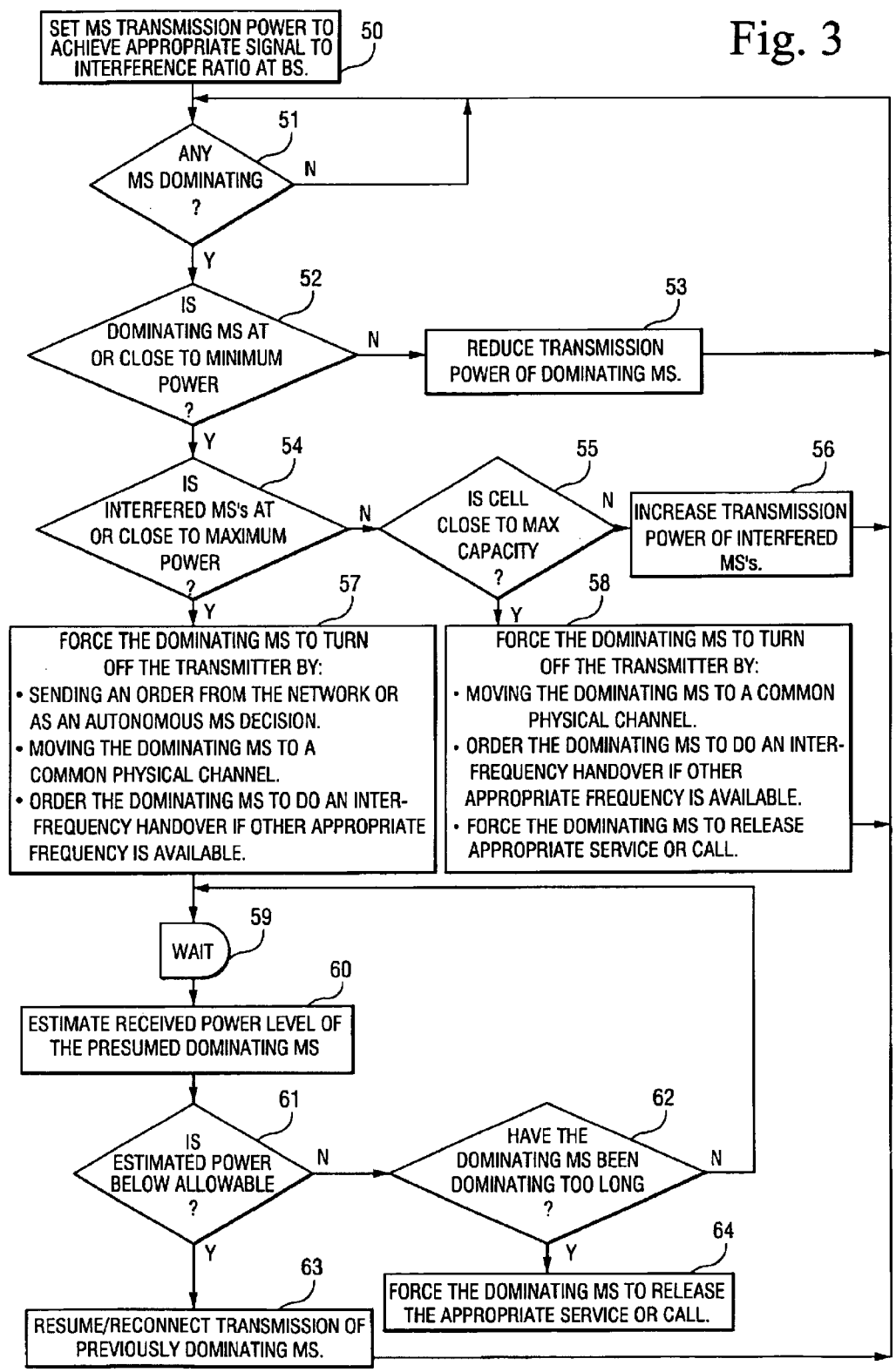
FIG. 3 is a schematic representation of the network, base station, and mobile station structures.

FIG. 3 illustrates an example embodiment of the present invention. In step 50 of FIG. 3, a mobile station or a base station sets each mobile station MSX transmission power levels to achieve a maximum allowable received signal at the base station. At step 51, the system (or a mobile station) determines whether any mobile station is dominating. If no mobile station is dominating, the flow returns to step 51 until a mobile station is determined to be dominating. That is, unless a mobile station is dominating, the further steps of the present invention are not invoked. At step 52, a mobile station has been determined to be dominating so the dominating mobile station first determines whether it's operating at its own minimum transmission power level dictated by its own dynamic range. If it is not, the dominating mobile station can reduce its transmission power at step 53 and allow the system to return to step 51 to determine whether that mobile station or any other mobile station continues to dominate transmissions.

If the dominating mobile station is already at its minimum power level at step 52, the base station or, more likely, the RNC, determines whether mobile stations that are being unacceptably interfered with by the dominating mobile stations are at their own individual maximum transmission power thresholds. If not, the interfered mobile stations can simply increase their transmission power at step 56, or the optional steps 55 and 58 can be included before the attempted increase in transmission of the interfered mobile stations. That is, at step 55, the base station or RNC determines if the cell is close to its maximum capacity and if so, the interfered mobile station is dropped at step 58. If not, the interfered mobile station is instructed to increase its transmission power at step 56.

If at step 54, the interfered mobile station is determined to be at its maximum power and (from step 52) the dominating mobile station has been determined to be at minimum power, the dominating mobile station is dropped at step 57. Step 57 may include the mobile station (M2, for example), shutting off the transmitter 22. Alternatively, the step 57 may include releasing a call being serviced by the mobile station M2.

The mobile station M2 which has recognized that it is dominating and cannot reduce its power level any further, must get its power turned off of the disturbed frequency. There are several options available for doing so.

1) The MS can make its own autonomous decision based on broadcasted data;
2) The network can order the MS to turn off its power and then let the MS resume transmission on its own decision based on the broadcasted data;
3) The network can order the MS to stop using a dedicated channel (MS power is turned off) and start using a common physical channel. While on a common channel, the MS will have a random access procedure to communicate with the system;
4) The network can order the MS to do an inter-frequency handover, i.e., stop transmitting on the disturbed frequency and start using a non-disturbed frequency, if available.
5) The service that is forcing the MS to use a dedicated channel can be released (may be viewed as a part-release of a call); or
6) The MS can do a complete call release releasing all services.

Thus, at step 59 the MS can wait and then determine at a future time whether it has then encountered a higher path loss situation such that it can transmit at its minimum power level and not dominate neighboring mobile stations. If the estimation of step 60 yields a conclusion that the mobile station which was previously dominating will continue to dominate if it resumes transmission, then step 61 returns the method to a new estimation. This continues until the estimation falls below an allowable level, at which time step 63 allows the previously dominating mobile station to resume or reconnect its transmissions. Alternatively, if the estimation does not fall below allowable at step 61, a determination is made at step 62 whether the MS has been dominating too long. If so, the MS is forced to release at step 64. If not, the MS continues to wait at step 59. At step 64, the dominating mobile station is instructed to do an inter-frequency handover to another cell and frequency that is not as heavily loaded or has mobiles that are already transmitting at the maximum level.

The present invention prohibits any one mobile station which may move too close to a base station from decreasing the coverage of the base station, reducing the capacity of the base station, dominating neighboring mobile stations, or making power control unstable in the cell as a result of incompensatably high transmission levels by the one mobile station. That is, one mobile station is not allowed to degrade quality or cause other mobile stations to have their calls dropped simply because the one mobile station is limited to a dynamic range that will not accommodate a low path loss condition.

In an alternative embodiment, mobile stations are permitted to use higher levels (continue to operate at their minimum transmission power level despite the fact that the base station is receiving the transmission at a non-uniformly high level) provided a particular sector has instantaneous conditions which provide margins for coverage, capacity, etc. which allow for this.

The present solution allows mobile stations which are designed to have more flexible limitations in dynamic range to utilize their extra performance and not be dropped in favor of a mobile station which has more severe limitations in dynamic range.

In an alternative embodiment, the decisions to turn the mobile station transmission off are taken directly from the mobile station and no extra functionality that controls the maximum reception levels is implemented. On the other hand, if the network is used for detection and control of the maximum levels, the base station or RNC can include the extra flexibility of selecting which mobile stations continue to transmit and which ones do not.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of controlling uplink power levels of mobile radios within a common cell having a base station, comprising:

sending and receiving transmissions from mobile radios within the cell to the base station, testing to determine if a dominating mobile radio is causing unacceptable interference with others of the mobile radios by transmitting at an instantaneous transmitter power that causes the base station to receive the dominating mobile radio communications at a relatively high received signal level compared to the others of the mobile radios, determining if the dominating mobile radio is transmitting at a minimum transmitter power level within a dynamic transmission power range of the mobile radio, if the dominating mobile radio is not transmitting at its minimum transmitter power level, reducing the dominating mobile radio's instantaneous transmitter power level and re-testing to determine if the dominating mobile radio is still causing unacceptable interference with others of the mobile radios by transmitting at the reduced instantaneous transmitter power level, if the dominating mobile radio is transmitting at its minimum transmitter power level, turning the transmitter of the dominating mobile radio off.

2. A method as in claim 1, wherein the testing step includes the steps of receiving a maximum allowed level of reception from the base station, reading a signal to interference target value, estimating an instantaneous received power level at the base station based on the signal to interference target value, and comparing the maximum allowed level of reception with the estimated instantaneous received power level.

3. A method of controlling uplink powers levels of mobile radios within a common cell having a base station, comprising:

sending and receiving transmissions from mobile radios with the cell to the base station, testing to determine if a dominating mobile radio is causing unacceptable interference with others of the mobile radios by transmitting at an instantaneous transmitter power that causes the base station to receive the dominating mobile radio communications at a relatively high signal level compared to the others of the mobile radios, determining if the dominating mobile radio is transmitting at a minimum transmitter power level within a dynamic transmission power range of the mobile radio, if the dominating mobile radio is not transmitting at its minimum transmitter power level, reducing the dominating mobile radio's instantaneous transmitter power level and re-testing to determine if the dominating mobile radio is still causing unacceptable interference with others of the mobile radios by transmitting at the reduced instantaneous transmitter power level, if the dominating mobile radio is transmitting at its minimum transmitter power level, testing to determine if any of the others of the mobile radios being interfered with by the dominating mobile radio are transmitting at respective maximum transmitter power levels, if all of the others of the mobile radios being interfered with by the dominating mobile radio are transmitting below their respective maximum transmitter power levels, increasing the instantaneous transmitter power levels of all of the others of the mobile radios, if any of the others of the mobile radios being interfered with by the dominating mobile radio are transmitting at their respective maximum transmitter power levels, then turning the dominating mobile radio off.

4. A method as in claim 3, wherein the testing step includes the steps of receiving a maximum allowed level of reception from the base station, reading a signal to interference target value, estimating an instantaneous received power level at the base station based on the signal to interference target value, and comparing the maximum allowed level of reception with the estimated instantaneous received power level.

5. A mobile radio, comprising:

a transmitter and receiver in communication with a base station, the transmitter operating at an adjustable power level within a dynamic range defined by a minimum transmitter power level and a maximum transmitter power level, the transmitter sending communications to the base station at transmitter power level within the dynamic range and the base station receiving the communications at received signal-to-interference (SIR) value;

a transmitter power controller to instruct the transmitter to adjust the transmitter power level upward when an evaluation of the received SIR value indicates that the received SIR value is unacceptably low, and to instruct the transmitter to adjust the transmitter power level downward when an evaluation of the received SIR value indicates that the received SIR value causes unacceptable interference with neighboring mobile radios, except that the transmitter power controller instructs the transmitter to turn off rather than adjust the transmitter power level downward if the evaluation indicates that the received SIR value cannot be brought below a maximum acceptable level without adjusting the transmitter power level to below the minimum transmitter power level.

6. A radio as in claim 5, wherein the evaluation of the received SIR value includes receipt by the mobile radio receiver of a communication from the base station identifying the maximum acceptable level of received signal.

7. A radio as in claim 5, wherein the evaluation of the received signal level includes receipt by the mobile radio receiver of a communication from the base station identifying a received SIR value above the maximum acceptable level of received signal.

8. A mobile radio, comprising:

a transmitter and receiver in communication with a base station (BS), the transmitter operating at an adjustable power level within a dynamic range defined by a minimum transmitter power level and a maximum transmitter power level, the transmitter sending communications to the base station at a transmitter power level within the dynamic range over a first frequency band and the base station (BS) receiving the communications at an instantaneous received signal level; and a transmitter power controller to instruct the transmitter to adjust the transmitter power level upward when an evaluation of the received signal level the received signal level is unacceptably low, and to instruct the transmitter to adjust the transmitter power level downward when the received signal level causes unacceptable interference with neighboring mobile radios, except that the transmitter power controller is configured to instruct the transmitter to stop transmitting over the first frequency band rather than adjust the transmitter power level downward if the received signal cannot be brought below a maximum acceptable level without adjusting the transmitter power level to below the minimum transmitter power level.

9. A radio as in claim 8, wherein the mobile radio receiver is configured to receive a communication from the base station identifying the maximum acceptable level of a received signal.

10. A radio as in claim 9, wherein the transmitter power controller further includes a pre-determined signal-to-interference ratio (SIR) target and the received signal level is determined based on the transmitter power level, the SIR target, and the maximum acceptable level of received signal.

11. A radio as in claim 8, wherein the received signal level is evaluated using a communication from the base station identifying a received signal level above the maximum acceptable level of received signal.

12. A radio as in claim 8, wherein when the transmitter power controller has instructed the transmitter to stop transmitting over the first frequency band, the transmitter power controller is configured to instruct the transmitter to resume transmission over the first frequency band after a predetermined time period.

13. A radio as in claim 8, wherein when the transmitter power controller has instructed the transmitter to stop transmitting over the first frequency band, the mobile radio is configured to perform an inter-frequency handover to a second frequency band, and the transmitter power controller is configured to instruct the transmitter to resume transmission over the second frequency band.

14. A radio as in claim 8, wherein the transmitter transmits over a dedicated radio channel, and wherein when the transmitter power controller has instructed the transmitter to stop transmitting over the dedicated radio channel, the transmitter power controller is configured to instruct the transmitter to resume transmission over a common radio channel.

15. A radio as in claim 8, wherein when the transmitter power controller has instructed the transmitter to stop transmitting over the first frequency band, one or more radio services being used by the mobile radio is released, and the transmitter power controller is configured to resume transmission over the first frequency band.

* * * * *